United States Patent [19]
Halimi et al.

[11] Patent Number: 5,867,987
[45] Date of Patent: Feb. 9, 1999

[54] METHOD AND APPARATUS FOR COMBINED IMPROVED ENGINE OPERATION, WARM-UP AND BRAKING

[75] Inventors: Edward M. Halimi, Montecito; William E. Woollenweber, Carlsbad, both of Calif.

[73] Assignee: Turbodyne Systems, Inc., Carpinteria, Calif.

[21] Appl. No.: 805,426

[22] Filed: Feb. 25, 1997

[51] Int. Cl.[6] .................................................. F02B 37/12
[52] U.S. Cl. ............................................................ 60/602
[58] Field of Search ........................ 60/600–603; 415/155

[56] References Cited

U.S. PATENT DOCUMENTS

| | | |
|---|---|---|
| 2,078,499 | 4/1937 | Ljungstrom . |
| 2,173,489 | 9/1939 | Voigt . |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 3,163,790 | 12/1964 | White . |
| 3,557,549 | 1/1971 | Webster . |
| 3,572,982 | 3/1971 | Kozdon . |
| 4,165,763 | 8/1979 | Hough ........................................ 60/602 |
| 4,445,337 | 5/1984 | McCreary . |
| 4,453,381 | 6/1984 | Dinger . |

(List continued on next page.)

FOREIGN PATENT DOCUMENTS

| | | |
|---|---|---|
| 295985 | 12/1988 | European Pat. Off. . |
| 367406 | 5/1990 | European Pat. Off. . |
| 2479899 | 10/1981 | France . |
| 3008180 | 9/1981 | Germany ................................. 60/602 |
| 57-212331 | of 0000 | Japan . |
| 58-148224 | 10/1983 | Japan ...................................... 60/602 |
| 58-172427 | 10/1983 | Japan ...................................... 60/602 |
| 58-222919 | 12/1983 | Japan . |
| 59-49323 | 3/1984 | Japan . |
| 3202633 | 9/1991 | Japan . |
| 4-112921 | 4/1992 | Japan . |
| 5-5419 | 1/1993 | Japan . |
| 308585 | 3/1921 | United Kingdom . |
| 267149 | 8/1927 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

*Primary Examiner*—Michael Koczo
*Attorney, Agent, or Firm*—Brinks Hofer Gilson & Lione

[57] ABSTRACT

An exhaust gas control system for controlling the flow of exhaust gases from an internal combustion engine to the turbine of a turbocharger can provide efficient engine operation over a full range of engine speeds and can be used to provide vehicle braking and reduced engine warm-up time. Such a system includes a combination valve upstream of a turbocharger turbine including diverter and restrictor sections, each section having a neutral position, the diverter and restrictor sections being independently operable from their neutral positions for concentrating the flow of exhaust gas to the turbine and for blocking the flow of exhaust gas to the turbine. Such systems can further include an ambient air temperature sensor for operating the diverter section and restrictor section in response to ambient air temperatures below a predetermined temperature for blocking the flow of exhaust gas to said turbocharger turbine for reduced warm-up times, a vehicle operator's switch for operating the diverter section and restrictor section for blocking the flow of exhaust gas to the turbocharger engine for vehicle braking, and an engine speed sensor for operating the diverter section in response to engine speeds below a predetermined speed for concentrating the flow of exhaust gas into the turbocharger turbine, for example, by directing exhaust gas from one passageway of a two passageway flow path to the other passageway.

17 Claims, 5 Drawing Sheets

U.S. PATENT DOCUMENTS

| | | |
|---|---|---|
| 4,565,505 | 1/1986 | Woollenweber . |
| 4,641,977 | 2/1987 | Woollenweber . |
| 4,708,095 | 11/1987 | Luterek . |
| 4,708,602 | 11/1987 | McEachern, Jr. et al. . |
| 4,719,757 | 1/1988 | Nakazawa et al. ................ 60/602 |
| 4,776,168 | 10/1988 | Woollenweber . |
| 4,827,170 | 5/1989 | Kawamura et al. . |
| 4,850,193 | 7/1989 | Kawamura . |
| 4,878,347 | 11/1989 | Kawamura . |
| 4,882,905 | 11/1989 | Kawamura . |
| 4,885,911 | 12/1989 | Woollenweber et al. . |
| 4,894,991 | 1/1990 | Kawamura . |
| 4,901,530 | 2/1990 | Kawamura . |
| 4,918,923 | 4/1990 | Woollenweber et al. . |
| 4,935,656 | 6/1990 | Kawamura . |
| 4,955,199 | 9/1990 | Kawamura . |
| 4,958,497 | 9/1990 | Kawamura . |
| 4,958,708 | 9/1990 | Kawamura . |
| 4,981,017 | 1/1991 | Hara et al. . |
| 4,998,951 | 3/1991 | Kawamura . |
| 5,025,629 | 6/1991 | Woollenweber . |
| 5,038,566 | 8/1991 | Hara . |
| 5,074,115 | 12/1991 | Kawamura . |
| 5,088,286 | 2/1992 | Muraji . |
| 5,094,587 | 3/1992 | Woollenweber . |
| 5,121,605 | 6/1992 | Oda et al. . |
| 5,176,509 | 1/1993 | Schmider et al. . |
| 5,406,979 | 4/1995 | Kawamura . |
| 5,560,208 | 10/1996 | Halimi et al. . |
| 5,605,045 | 2/1997 | Halimi et al. . |

METHOD AND APPARATUS FOR COMBINED IMPROVED ENGINE OPERATION, WARM-UP AND BRAKING

BACKGROUND OF THE INVENTION

1. Field of the Invention

The present invention relates generally to method and apparatus for operating internal combustion engines. More particularly, this invention relates to internal combustion engine systems including an engine exhaust gas control system that can raise low engine speed turbocharger boost pressure and can decrease engine warm-up times and can increase the back pressure in the engine exhaust system to provide engine braking.

2. Description of the Prior Art

Fixed geometry turbochargers can be designed to operate efficiently at a particular engine load and speed. However, when operated over a broad range of engine speed and load, the compressor and turbine components are forced to function off their design points; and, consequently, suffer losses in efficiency that adversely affect engine performance. For example, if the turbocharger is matched to an engine at the engine's rated speed, it will run considerably off its maximum efficiency when the engine is "torqued down" to low engine operating speeds. Conversely, if the turbocharger is matched to an engine's low speed range, the turbocharger will have a tendency to "overspeed" when the engine is operated at maximum speed and load.

To prevent overspeeding in turbochargers that have been matched to the low engine speed range, a waste gate is frequently used to bypass exhaust gas around the turbine to limit turbine speed over the high engine speed range. The waste gate, however, allows the escape of exhaust gas energy, which could be better utilized by the turbocharger turbine and results in a substantial loss in system efficiency.

A more efficient system generally known in the trade is one comprising variable geometry components in the turbocharger compressor, the turbocharger turbine, or both. The most common types are variable nozzle vanes ahead of the turbine wheel and/or variable diffuser vanes in the compressor component.

Variable nozzle vanes ahead of the turbine wheel are connected together so that the throat area of each nozzle passage can be reduced over the low engine speed range and increased as the engine speed approaches its maximum, so that the turbocharger speed is kept within a safe operating range. The positioning of the vanes must be precisely controlled by engine speed and load, and they must be freely movable in the hot exhaust gas environment with minimal leakage through clearance spaces.

The various movable devices that have been employed in the turbocharger turbine have been complicated, expensive, and subject to questionable durability. Consequently, they have met with limited commercial success.

A more practical approach is the variable device in the engine exhaust system disclosed in U.S. Pat. No. 3,557,549 to Webster. The system disclosed in this patent employs a flapper valve so positioned in a divided manifold system that it resides in a neutral position at high engine speed and load, but can be moved to a second position where it diverts all engine exhaust gas flow into one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning.

The use of a flapper valve to divert exhaust gas allows the turbocharger to be matched efficiently to higher engine speeds when the flapper is in a neutral position. When the engine is operated at low engine speeds, the concentration of full exhaust flow in the single turbine casing passage ahead of the turbine increases the turbocharger rotor speed to provide higher boost pressure to the engine cylinders, allowing the engine to produce more power and torque than otherwise could be obtained.

SUMMARY OF THE INVENTION

The present invention provides a system for internal combustion engines which provides efficient engine operation over a full range of engine speeds and can be used to provide vehicle braking and reduced engine warm-up time.

Methods and apparatus of the invention include an exhaust gas control system for controlling the flow of exhaust gases from an internal combustion engine to the turbine, comprising a combination valve positioned upstream of a turbocharger turbine and including a diverter section and a restrictor section, each section having a neutral position, the diverter section and restrictor section being operable from their neutral positions for concentrating the flow of exhaust gas to the turbine and for blocking the flow of exhaust gas to the turbine; and further comprising a valve control coupled to the diverter section and the restrictor section for independently operating the sections together or separately. Such systems can further comprise an ambient air temperature sensor connected with the valve control, so the valve control can operate the diverter section and restrictor section in response to ambient air temperatures below a predetermined temperature for blocking the flow of exhaust gas to said turbocharger turbine for reduced warm-up times, and/or a vehicle operator's switch connected with the valve control for operating the diverter section and restrictor section for blocking the flow of exhaust gas to the turbocharger engine for vehicle braking, and/or an engine speed sensor connected with the valve control, so the valve control can operate the diverter section in response to engine speeds below a predetermined speed for concentrating the flow of exhaust gas into the turbocharger turbine, for example, by directing exhaust gas from one passageway of a two passageway flow path to the other passageway.

A preferred embodiment of the invention provides three methods of operation.

A first method of operation employs an engine speed sensor to send an engine speed signal to the valve control for the combination valve. At engine speeds below a predetermined value, i.e., in the low engine speed range below torque peak speed, the diverter section is moved to a position concentrating the flow of exhaust gas to the turbocharger turbine and raising the turbocharger boost pressure to higher values to provide more low speed engine torque while the restrictor section remains in the neutral position. When the engine speed increases to a predetermined level, the valve control moves the diverter section to the neutral position in response to the engine speed signal. This reduces the concentration of the exhaust gas flow into the turbocharger turbine and limits maximum turbocharger speed to a safe level.

In a second method of operation, a temperature sensor is employed to sense ambient air temperature and send a signal to the valve control to operate both sections of the combination valve and substantially block the flow of exhaust gas to the turbocharger turbine when the temperature falls below a predetermined value. The valve returns control to both sections of the combination valve to their neutral positions when the engine temperature reaches a predetermined higher value or after a specific length of time. As well known, a small percentage of the exhaust gas must be allowed to flow in order to allow the engine to keep running; however, the nearly total blockage of exhaust flow causes a rapid warm-up of internal engine parts and reduces the formation of white smoke during engine warm-up in cold weather.

In a third method of operation engine braking may be affected. For example, a dash switch can be provided so that a vehicle operator can operate both sections of the combination valve (the same as in the engine warm-up method), substantially blocking the exhaust gas flow and producing a high back pressure in the exhaust manifold (up to about 60 psi) while the engine is operating at high speed, such as occurs when a vehicle is going downhill. When the dash switch is turned off, the valve control can return the restrictor section to neutral and may or may not return the diverter section to neutral, depending on the level of engine speed. If the engine speed is high, the diverter valve section may be returned to neutral, and if the engine speed is low, the diverter section can remain in an exhaust gas concentrating or diverting position.

The invention further includes a combination valve for controlling the flow of exhaust gas from an internal combustion engine comprising a valve housing forming two passageways for exhaust gas flow, and first and second valve members for the two passageways. The first valve member having a neutral position permitting substantially unrestricted exhaust gas flow through the housing passageways and a diverter position diverting flow of exhaust gas from one passageway to the other passageway, and the second valve member having a neutral position permitting substantially unrestricted exhaust gas flow through the housing passageways and a blocking position blocking flow through said other passageway. The valve housing may in a preferred embodiment include a housing divider forming the two exhaust gas passageways, and carrying the first and second valve members, which may be, preferably, flapper members hinged to the housing divider and movable between their neutral positions and their diverter and blocking positions. Preferably, the first valve closes an opening in the housing divider in its neutral position and opens the opening and substantially blocks exhaust gas flow in the one passageway in its diverter position.

Exhaust gas control systems according to the present invention provide a significant improvement over costly and complicated variable geometry nozzle vanes in a turbocharger turbine. Combination valves including diverter and restrictor sections are a significant simplification over the complication of engine brakes that hold open the engine exhaust valves to produce a braking effect by preventing re-expansion of the gas in the engine cylinders (Jacobs brake) and over the type of exhaust brake placed downstream of the turbocharger in the exhaust pipe where the high back pressure produced acts against the oil seals in the turbocharger. Furthermore, the combination valve of the present invention provides an additional advantage of acting as a restrictor to allow fast engine warm-up in cold weather and eliminates the need for a separately controlled valve usually placed in the turbocharger turbine exhaust exit area.

Further features and advantages of the present invention will become apparent from the following detailed description of a presently preferred embodiment.

BRIEF DESCRIPTION OF THE DRAWINGS

FIG. 2 schematically illustrates a system including a combination valve according to a presently preferred embodiment of the invention in a first operative position of the valve;

FIG. 3 illustrates the system of FIG. 2 in a second operative position;

FIG. 4 illustrates the system of FIG. 2 in a third operative position;

DETAILED DESCRIPTION OF THE PREFERRED EMBODIMENT

Figure 1:
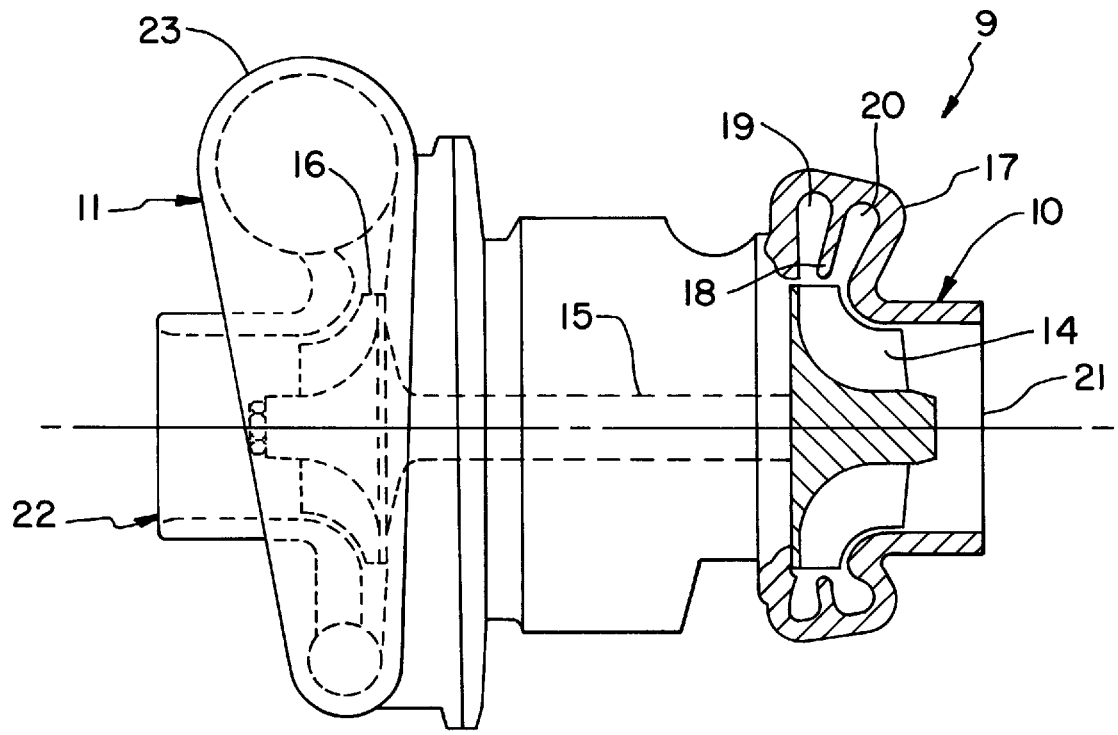
FIG. 1 is a schematic view, partially in cross-section, of a prior art turbocharger which may be used in the present invention.

FIG. 1 schematically illustrates a turbocharger 9 which comprises a turbine 10 and a compressor 11. The turbine comprises a rotor 14 secured to one end of a shaft 15 mounted for rotation about its longitudinal axis by suitable bearings. A compressor wheel 16 is secured to the other end of the shaft.

The turbine comprises a volute housing 17 having an annular partition 18 secured therein such that the turbine's scroll-type chamber is divided into two passageways or volutes 19 and 20 for directing exhaust gases from the exhaust manifold 24 (FIGS. 2–4) of an internal combustion engine 25 radially into the turbine rotor 14.

As known to those skilled in the art, the exhaust gas passes through the bladed passageways formed on the turbine rotor and is exhausted through a circular outlet 21. The rotor functions to rotate shaft 15 and the compressor wheel 16 to pump ambient air from a compressor inlet 22 to a compressor outlet 23. The outlet is adapted to be suitably attached to the intake manifold (not shown) of the internal combustion engine 25 to supply cylinder charge air thereto for combustion purposes.

Conventional turbochargers are normally designed for efficient operation within a predetermined range of engine operation. When the engine operates outside of such a range, the engine exhaust gas energy often falls below a level required for efficiently driving the turbocharger. This may occur, for example, during idle and low-speed phases of engine operation. Conversely, when the engine is operated at a high speed and load, the turbocharger may have a tendency to "overspeed."

Figure 2:
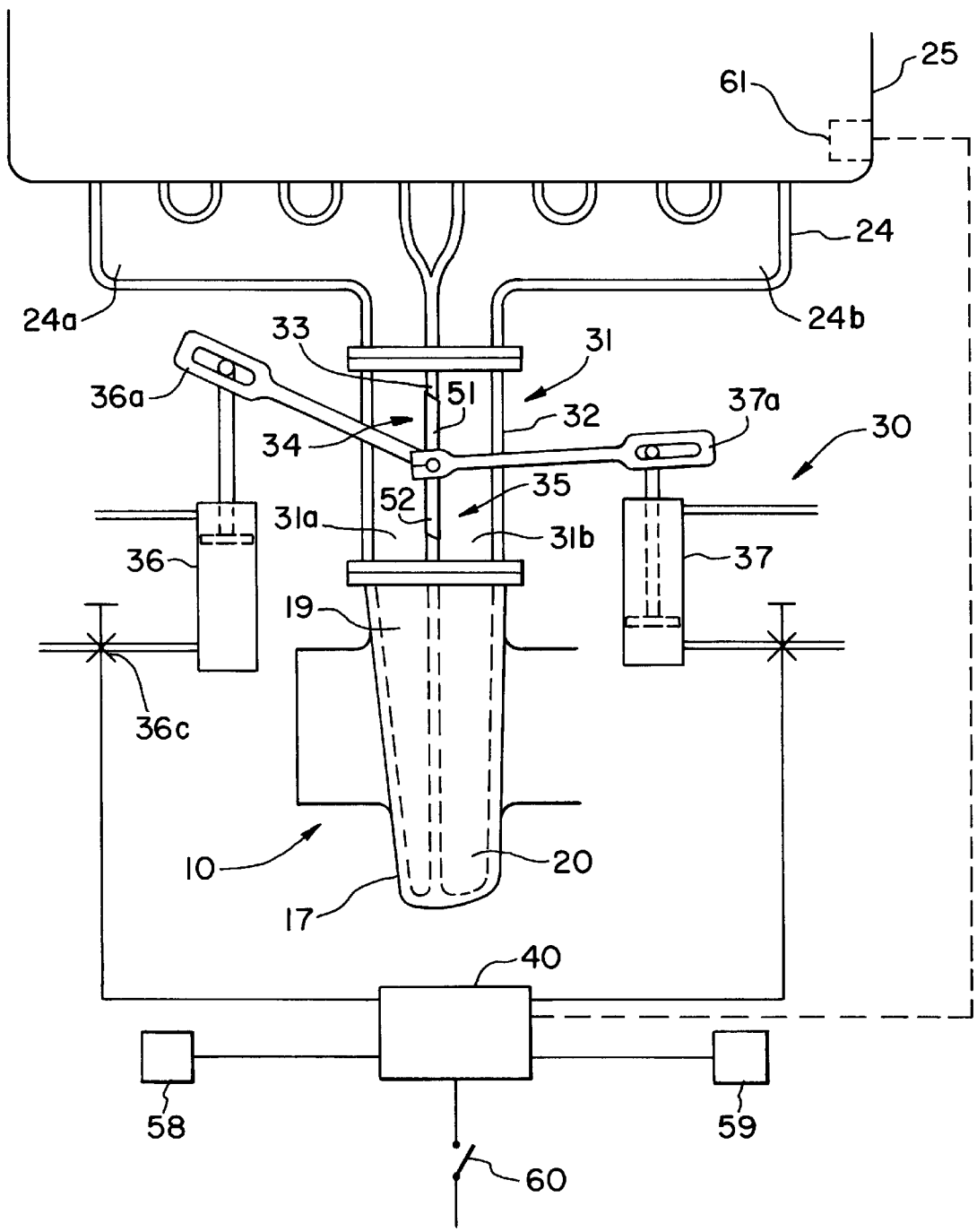
FIGS. 2–4 schematically illustrate a system of the invention in various modes of operation with a side of the combination valve housing removed to show the operations.
Figure 3:
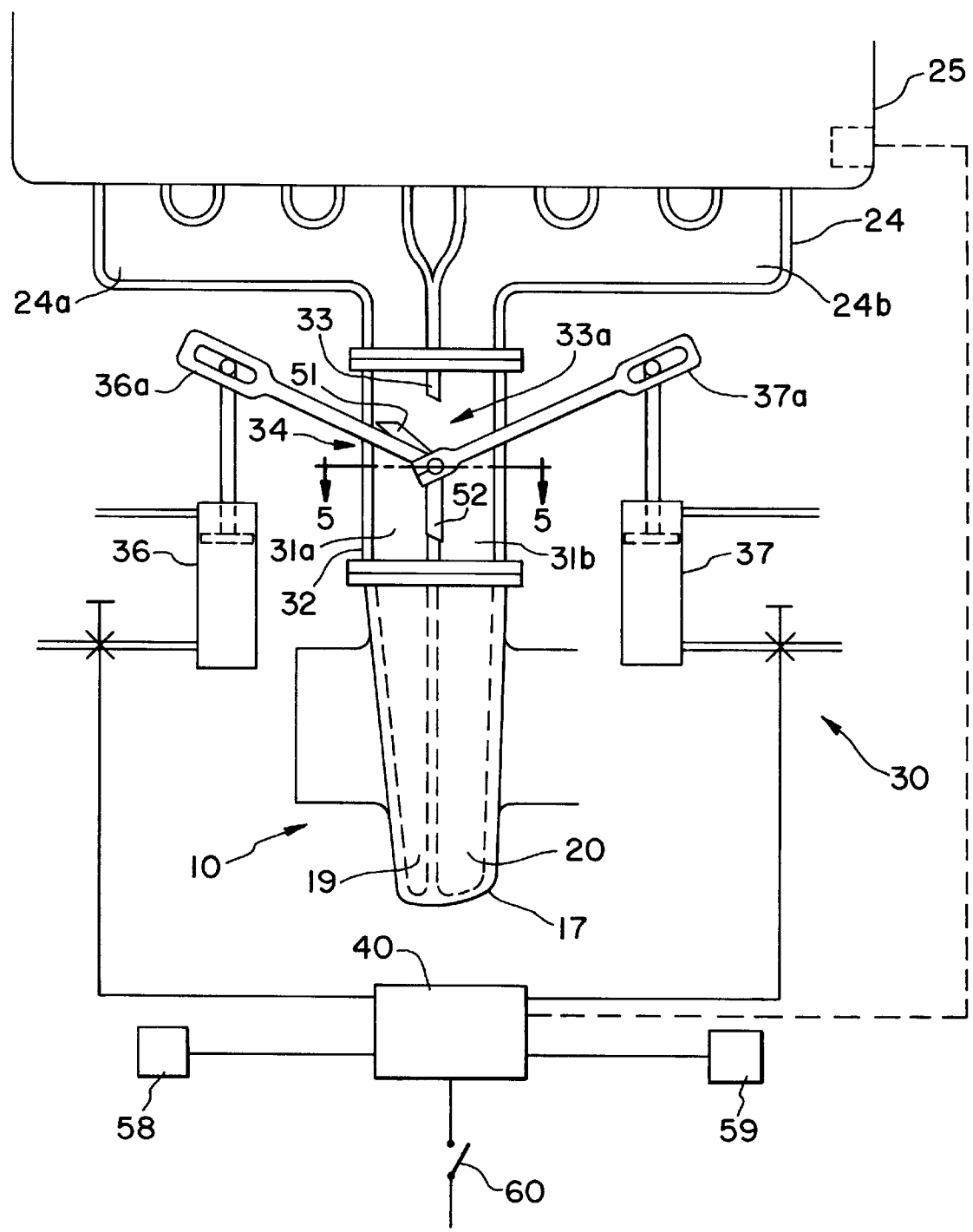
Figure 4:
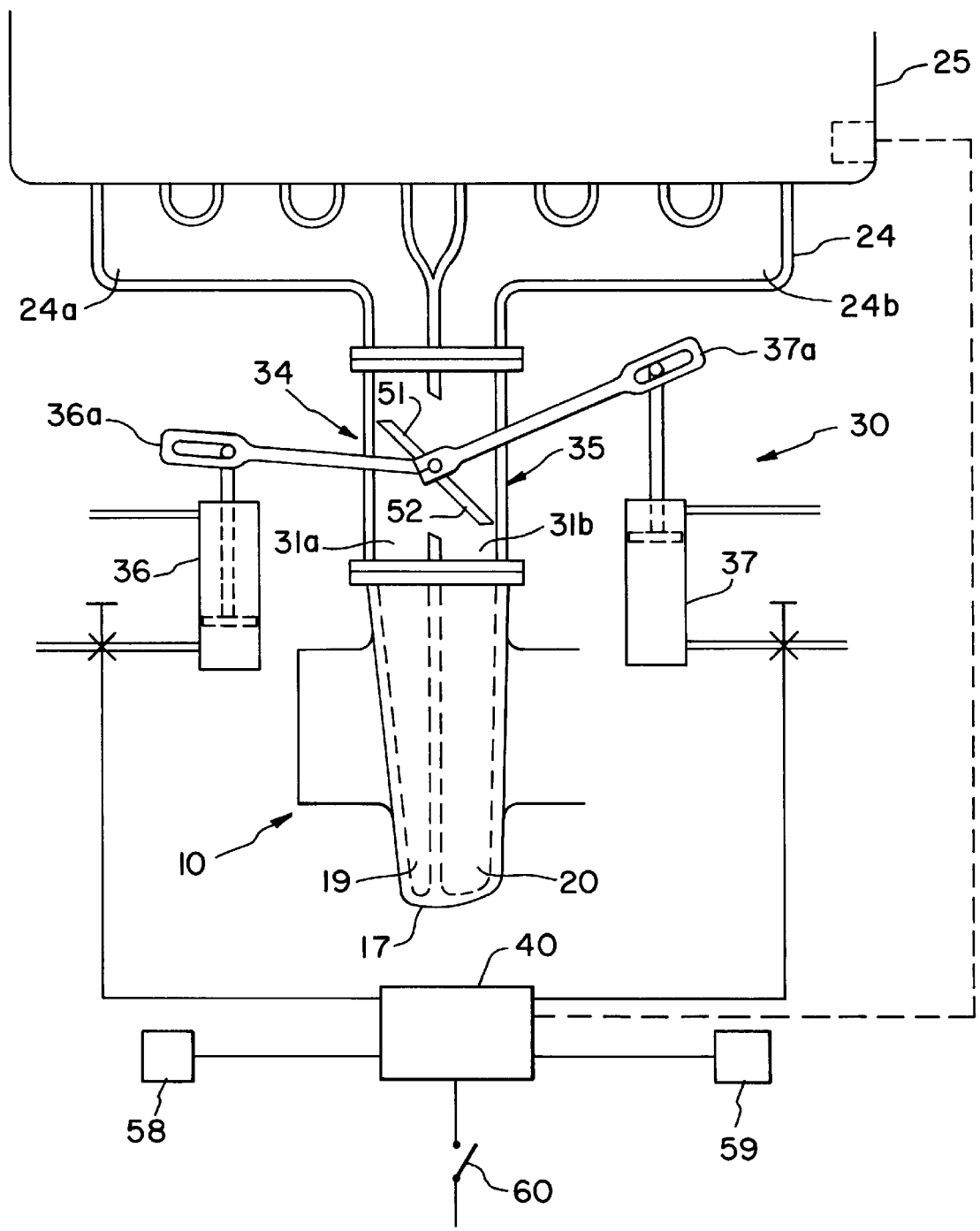

In systems of the present invention, FIGS. 2–4, an exhaust gas control system 30 is provided upstream of the turbocharger turbine 10 to control the flow of exhaust gases into the divided passageways 19, 20 of the turbocharger housing 17 so as to enhance turbocharger operation over the full range of engine operating speeds and loads and, in addition, to provide engine and vehicle braking and to reduce engine warm-up times.

As illustrated in FIGS. 2–4, the exhaust gas control system 30 includes a combination valve 31 positioned upstream of the turbocharger turbine 10 between the turbine and the exhaust gas manifold 24. As well known in the art, the exhaust gas manifold 24 includes a passage 24a for the exhaust gas from one bank of cylinders of the internal combustion engine 25 and a passage 24b is for the exhaust gas from the other bank of cylinders of the internal combustion engine, and each passage 24*a*, 24*b* of the exhaust gas manifold 24 is connected with one of the passageways, e.g., 19 and 20 respectively, of the turbocharger turbine volute 17. The combination valve 31, by its housing 32 and a housing divider 33, forms two passageways 31*a*, 31*b* between the passages 24*a*, 24*b* of the exhaust gas manifold and the passageways 19, 20 of the turbocharger turbine volute. The flow of exhaust gas through the two passageways 31*a*, 31*b* is controlled by a diverter section 34 and a restrictor section 35 that are operated by a pair of actuators 36, 37 and a valve control 40.

Figure 5:
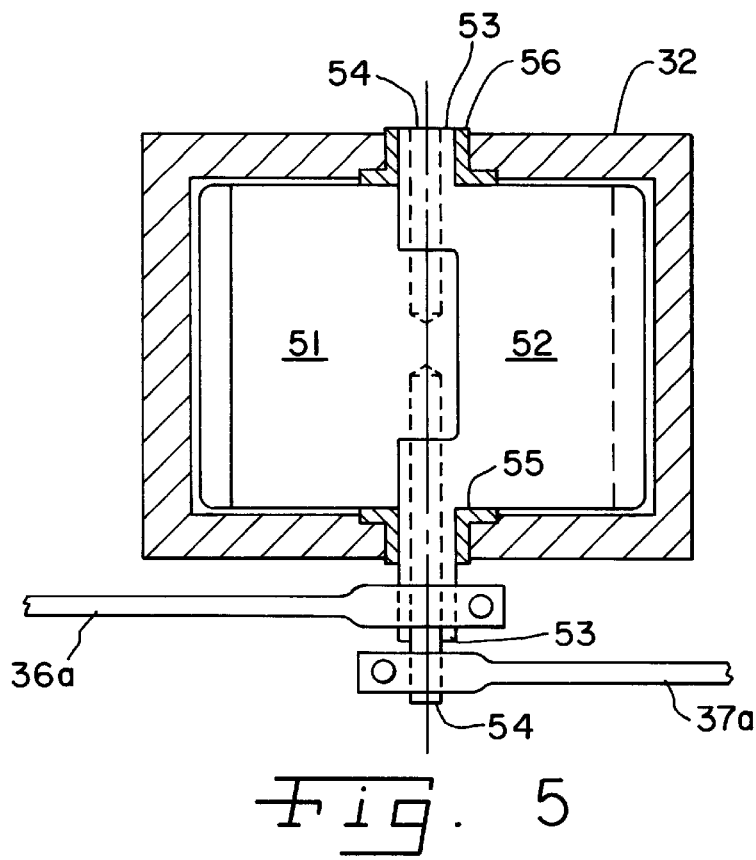
FIG. 5 is a cross-section of the combination valve of FIG. 3 taken at a plane corresponding to line 5—5 of FIG. 3 to illustrate the third operative position of FIG. 4.

As shown in FIGS. 2–5, a preferred combination valve 31 of the invention includes a valve housing 32 forming two passageways 31*a*, 31*b* by a central housing divider 33. The housing 31 carries first and second valve members 51 and 52. The valve members 51, 52 both have a neutral position, shown in FIG. 2, permitting substantially unrestricted flow of exhaust gas between the internal combustion engine manifold 24 and the turbocharger 10. The first valve member 51 forms the diverter section 34 of the combination valve and has a diverter position, shown in FIG. 3 directing the flow of exhaust gas from one passageway 31*a* to the other passageway 31*b*. The second valve member 52 has a blocking position, shown in FIGS. 4 and 5, substantially blocking exhaust gas flow through the other passageway 31*b*. As shown in FIG. 5, at least the second valve member 52 does not completely close the combination valve 31 to the flow of exhaust gas, but in combination with the first valve member 51 in the diverter position, as shown in FIGS. 4 and 5, valve members 51 and 52 substantially block exhaust gas flow between the manifold 24 of the internal combustion engine and the turbocharger 10 and in this position cause a high back pressure to exist in exhaust manifold 24.

As indicated by FIGS. 2–5, the first and second valve members 51, 52 are preferably flapper members hinged to and carried by the housing divider 33 and independently operable by the actuators 36, 37 between their neutral positions (FIG. 2) and their diverter and blocking positions (FIGS. 4 and 5). As shown in FIGS. 2–4, at least the first valve 51 closes an opening 33*a* in the housing divider 33 in its neutral position (See FIG. 2) and opens the opening 33*a* and substantially blocks exhaust gas flow through housing passageway 31*a* in its diverter position, thereby diverting exhaust gas flow from housing passageway 31*a* to housing passageway 31*b* (See FIG. 3) and concentrating exhaust gas flow into volute passageway 20 and into the turbocharger turbine rotor 14.

As shown in FIG. 5 in preferred combination valves, the first and second flapper valves 51, 52 are carried by co-axial axles 53, 54, which extend outwardly of the housing 32 for connection with actuators 36, 37. In such preferred constructions of the combination valve 31, the housing 32 carries a pair of journal bearings 55, 56 in substantial alignment with the housing divider 33. The second valve flapper member 52 is connected with the tubular axle 53 which is rotatably carried by the journal bearings 55, 56. The first valve flapper member 51 is connected to the second axle 54, which is rotatably carried by the tubular axle 53. Thus, each of the flapper valve means 51, 52 are independently rotatable and are operated by actuating arms 36*a*, 37*a* extending from the actuators 36, 37.

The actuators 36, 37 are independently operable by the valve control 40 in response to various inputs, including, for example, an engine speed sensor 58, an ambient air temperature sensor 59 and a vehicle operator's dash switch 60, and are preferably provided with spring returns to move them to their neutral positions in the absence of an operating output of valve control 40.

As shown in FIG. 2, the turbocharger volute 17 is connected to an internal combustion engine 25 at its manifold 24 so that exhaust gas from one bank of cylinders is directed through exhaust manifold portion 24*a* to first passageway 19, and exhaust gas from the other set of cylinders is directed through exhaust manifold portion 24*b* to second passageway 20. The exhaust gas from the first and second passageways 19 and 20, respectively, are directed to rotate the turbine wheel 14 and compressor wheel 16.

During idle and low-speed phases of engine operation, the speed of conventional turbochargers normally tend to drop below a level required to assure proper engine performance. In order to maintain an appropriate turbocharger speed during all phases of engine operation, it is known to provide a valve at the turbine's inlet as is described in U.S. Pat. No. 3,557,549. The valve referred to therein is like the diverter valve 51, which is movable between a neutral position shown in FIG. 2 and a diverter position shown in FIG. 3. The function of the valve 51 is to concentrate the gas flow from the engine to the turbocharger turbine by blocking passageway 31*a* and directing exhaust gas through opening 33*a* so substantially all exhaust gases will be directed into passageway 31*b* and a single volute passageway 20 during idle and low speed operation of the internal combustion engine.

As indicated previously, the use of the diverter or flapper valve 51 to concentrate or divide exhaust gas flow into the turbocharger turbine allows the turbocharger to be operated efficiently at lower and at higher engine speeds. When the engine is operated at low engine speeds, the diversion of full exhaust flow to the single volute turbine passageway 20 ahead of the turbine, as shown in FIG. 3, increases the turbocharger rotor speed to provide higher boost pressure to the engine cylinders, allowing the engine to produce more power and torque than could otherwise be obtained. As indicated in FIG. 3, the exhaust gas control system 30 can include an engine speed sensor 58 to provide the valve control 40 with an engine speed signal. When the speed of the internal combustion engine is below a preselected minimum speed, the valve control 40 can open a fluid control valve 36*c* pressurizing actuator 36 and moving valve 51 from its neutral to its diverter position.

In one method of operation, the valve control 40 receives signals from an engine speed sensor 58 to control the position of the diverter valve 51. In this first mode of operation, at engine speeds below a predetermined value, i.e., in the low engine speed range below torque peak speed, the diverter valve 51 is moved to the position shown in FIG. 3. This raises the turbocharger boost pressure to higher values for low engine speeds. The restrictor valve 52 remains in the neutral position as shown in FIGS. 2 and 3. When the engine speed is increased to the predetermined level, the valve control means 40 returns the diverter section 51 to the neutral position shown in FIG. 2. This opens both volutes of the turbine casing to exhaust gas flow and prevents the turbocharger from operating at excessive speeds.

In a second method of operation, a temperature sensor 59 is coupled to the valve control means 40 and is employed to sense ambient air temperature and to send a signal to the valve control 40 means to operate both the diverter and blocking sections 34, 35 of the combination valve 31 as shown in FIGS. 4 and 5 when the temperature falls below a predetermined value. As shown in FIGS. 4 and 5, in this second method of operation, the first and second flapper valve members 51, 52 are positioned to substantially block exhaust gas flow between the engine 25 and the turbocharger 10. A separate engine temperature sensor 61 can be employed to send an engine temperature signal to the valve control means 40 to return the diverter and blocking sections of the valve back to the neutral position as shown in FIG. 2 when the engine temperature reaches the predetermined value, or the valve control 40 can return the diverter and blocking sections to their neutral positions after a specific length of time. It should be noted that even when both valves 51, 52 are in the blocking positions, blockage of the exhaust flow is not 100 percent since some percentage of the exhaust gas must be allowed to escape in order to keep the engine running. The nearly total blockage of exhaust flow, however, causes a rapid warm up of internal engine parts and reduces the formation of white smoke during engine warm-up in cold weather.

A third method of operation is when engine braking is required. A dash switch 60 can be provided so that a vehicle operator can activate the braking position of the combination valve 31 (which is the same as the engine warm-up position shown in FIGS. 4 and 5). The blockage of the exhaust gas flow with the valves 51, 52 in the position shown in FIGS. 4 and 5 produces a high back pressure in the exhaust manifold (up to about 60 psi) while the engine is operating a high speed, such as occurs when a vehicle is going down hill. To produce engine braking, the dash switch 60 is turned on to signal the valve control 40 to move both sections of the combination valve 31 to the blocking positions as shown in FIG. 4. When the switch is turned off, the valve control 40 returns the restrictor section, valve member 52, to neutral and may or may not return the diverter section, valve member 51, to neutral, depending on the level of engine speed sensed by engine speed sensor 58. If the engine speed is high, the diverter section valve 51 returns to neutral. If the engine speed is low, however, the diverter section valve 51, remains in a diverted position as shown in FIG. 3.

It should be apparent to those skilled in the art that exhaust gas control systems, including a combination valve, as in the present invention can provide a significant improvement over the costly and complicated variable geometry nozzle vanes in a turbocharger turbine. The combination valve including a diverter section and a restrictor section and its methods of operation provide a substantial improvement over the complication of engine brakes that hold open the engine exhaust valves to produce a braking effect by preventing re-expansion of the gas in the engine cylinders Jacobs brake), and exhaust brakes placed downstream of the turbocharger in the exhaust pipe where the high back pressure produced acts against the oil seals in the turbocharger. Further, the systems of the invention can be operated to provide fast engine warm-up in cold weather and eliminate the need for a separately controlled valve usually placed in the turbocharger turbine exhaust exit area.

The actuators 36, 37 for the hinged valves 51, 52 are shown as single acting, spring return fluid pressure actuated cylinders, such as air cylinders or hydraulic cylinders using, for example, engine oil pressure. However, the actuators may be solenoids using electrical system power, or the like. Spring returns may be included in the valve actuating systems to avoid double-acting actuators.

Figure 6:
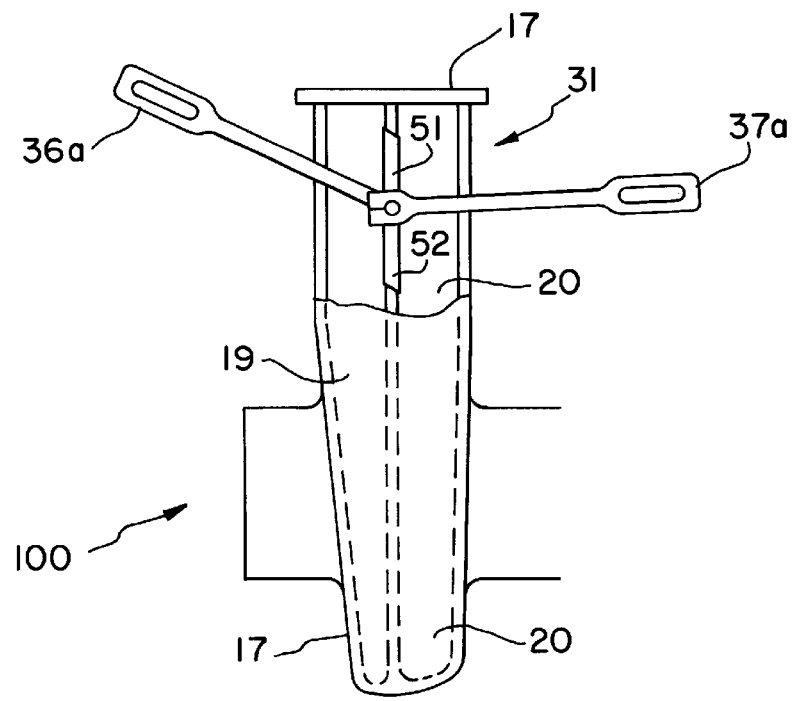
FIG. 6 is a cross-section of a turbocharger with the invention.

While FIGS. 2–4 show a separate combination valve 31, FIG. 6 shows a turbocharger 100 incorporating a flow concentrating and blocking valve. In FIG. 6, the turbocharger housing 17 is partially broken away to illustrate such a valve in the turbocharger housing 17. As shown by FIG. 6, a combination valve 31 can be incorporated, for example, in the exhaust gas entrance of the turbine. In the FIG. 6 example, valve members 51, 52 are incorporated into an extension of the volute housing 17 between passageways 19 and 20 and can be operated as illustrated in FIGS. 2–4 to effect the same results. Further, although the preferred embodiment of the invention illustrated includes a dual hinged flapper valve construction, those skilled in the art will realize that systems of the invention can include other types of valve mechanisms and provide the same desirable operating methods and apparatus. Accordingly, the invention should be limited only insofar as is required by the scope of the following claims.

We claim:

1. An internal combustion engine system, comprising:
an internal combustion engine having a divided exhaust gas manifold with each of two exhaust passageways being connected with a bank of the cylinders of the internal combustion engine and having an air intake manifold for the cylinders of the internal combustion engine;
a turbocharger having an exhaust gas turbine wheel, and a divided exhaust gas turbine volute forming two exhaust gas inlets to the turbine wheel, each of said exhaust gas inlets being connected with one of the exhaust gas passageways of the exhaust gas manifold, and having a charge air compressor driven by the exhaust gas turbine;
an exhaust gas control valve having two exhaust gas passageways; each exhaust gas passageway being connected between an exhaust gas passageway of the divided exhaust gas manifold and an exhaust gas passageway of the divided exhaust gas turbine volute,
said exhaust gas control valve having a diverter valve to block exhaust gas flow to one passageway of the divided exhaust gas turbine volute and direct the blocked exhaust gas flow to the other passageway of the divided exhaust gas turbine volute, and having a restrictor valve to block exhaust gas flow to said other passageway of the divided exhaust gas turbine volute,
actuators for said diverter valve and said restrictor valve; and
a control for said valve actuators, said control including an engine speed sensor and a first actuator connected with said diverter valve, and an engine temperature sensor and a second actuator connected with said restrictor valve.

2. The system of claim 1 further comprising a dash switch for engine braking control connected with said restrictor valve.

3. A combination valve for controlling the flow of exhaust gas from an internal combustion engine to the turbine of an internal combustion engine turbocharger, comprising:
a valve housing including a divider forming two passageways for exhaust gas flow,
first and second flapper valve members for said two passageways carried by and hinged to said housing divider, said first flapper valve member being movable between a neutral position permitting substantially unrestricted exhaust gas flow through the housing and a diverter position diverting flow of exhaust gas from one passageway to the other passageway, said second flapper valve member being movable between a neutral position permitting substantially unrestricted exhaust gas flow through the housing and a blocking position substantially blocking flow through said other passageway.

4. The combination valve of claim 3 wherein said first valve closes an opening in the housing divider in its neutral position and opens said opening and substantially blocks exhaust gas flow in said one passageway in its diverter position.

5. The combination valve of claim 3 wherein said first and second flapper valve members are carried by co-axial axles.

6. The combination valve of claim 5 wherein said housing carries a pair of journal bearings in substantial alignment with said housing divider, one of said first and second flapper valve members is rotatably connected with a tubular axle rotatably carried by said pair of journal bearings and the other of said first and second flapper valve members is connected with a second axle rotatably carried by said tubular axle.

7. The combination valve of claim 6 wherein said tubular axle extends outwardly from said housing for valve operation and said second axle extends outwardly from said housing and said tubular axle of valve operation.

8. A method of operating an internal combustion engine by controlling the flow of exhaust gas from each bank of cylinders of the internal combustion engine to a divided turbocharger turbine volute, comprising:

sensing ambient air temperature and blocking a substantial portion of the exhaust gas flow from each bank of cylinders to the divided turbocharger turbine volute when the ambient air temperature is below a predetermined value, and unblocking the exhaust gas flow from each bank of cylinders of the internal combustion engine to the turbocharger turbine volute after the internal combustion engine reaches a predetermined temperature or after a predetermined time period.

9. An exhaust gas control system for controlling the flow of exhaust gases from an internal combustion engine to a turbocharger turbine, comprising a combination valve positioned upstream of the turbocharger turbine and including a diverter section and a restrictor section, each having a neutral position, said diverter section and restrictor sections being independently operable from their neutral positions for concentrating the flow of exhaust gas to the turbine and for substantially blocking the flow of exhaust gas to the turbine; and a valve control coupled to said diverter section and said restrictor section for independently operating said sections together or separately, and an ambient air temperature sensor connected with the valve control, said valve control operating said diverter section and restrictor section in response to ambient air temperatures below a predetermined temperature for substantially blocking the flow of exhaust gas to said turbocharger turbine.

10. The system of claim 9 further comprising an engine speed sensor connected with the valve control, said valve control operating said diverter section in response to engine speeds below a predetermined speed for concentrating the flow of exhaust gas to said turbocharger turbine.

11. The system of claim 9 further comprising a vehicle operator's switch connected with said valve control for operating said diverter section and said restrictor section for substantially blocking the flow of exhaust gas to said turbocharger turbine for vehicle braking.

12. The system of claim 10 further comprising a vehicle operator's switch connected with said valve control for operating said diverter section and said restrictor section for substantially blocking the flow of exhaust gas to said turbocharger for vehicle braking.

13. A turbocharger including means for controlling the flow of exhaust gas from an internal combustion engine into its turbine, comprising:

an exhaust gas entrance to the turbine including a divider forming two passageways for exhaust gas flow, and first and second valve members for said two passageways carried by said divider, said first valve member having a neutral position permitting substantially unrestricted exhaust gas flow to the turbine and a flow concentrating position diverting flow of exhaust gas from one passageway to the other passageway, said second valve member having a neutral position permitting substantially unrestricted exhaust gas flow to the turbine and a blocking position substantially blocking flow through said other passageway, wherein said first and second valve members are flapper members hinged to the divider and movable between their neutral positions and said flow concentrating and blocking positions.

14. A turbocharger including means for controlling the flow of exhaust gas from an internal combustion engine into its turbine, comprising:

an exhaust gas entrance to the turbine including a divider forming two passageways for exhaust gas flow, and first and second valve members for said two passageways carried by said divider, said first valve member having a neutral position permitting substantially unrestricted exhaust gas flow to the turbine and a flow concentrating position diverting flow of exhaust gas from one passageway to the other passageway, said second valve member having a neutral position permitting substantially unrestricted exhaust gas flow to the turbine and a blocking position substantially blocking flow through said other passageway, wherein said first valve member closes an opening in the divider in its neutral position and opens said opening and substantially blocks exhaust gas flow in said one passageway in its flow concentrating position.

15. The turbocharger of claim 13 wherein said first and second flapper valve members are carried by co-axial axles.

16. A turbocharger including means for controlling the flow of exhaust gas from an internal combustion engine into its turbine, comprising:

an exhaust gas entrance to the turbine including a divider forming two passageways for exhaust gas flow, and first and second flapper valve members for said two passageways carried by said divider, said first valve member having a neutral position permitting substantially unrestricted exhaust gas flow to the turbine and a flow concentrating position diverting flow of exhaust gas from one passageway to the other passageway, said second valve member having a neutral position permitting substantially unrestricted exhaust gas flow to the turbine and a blocking position substantially blocking flow through said other passageway, wherein said exhaust gas entrance carries a pair of journal bearings in substantial alignment with said divider, one of said first and second flapper valve members is rotatably connected with a tubular axle rotatably carried by said pair of journal bearings and the other of said first and second flapper valve members is connected with a second axle rotatably carried by said tubular axle.

17. The turbocharger of claim 16 wherein said tubular axle extends outwardly from said exhaust gas entrance for valve operation and said second axle extends outwardly from said exhaust gas entrance and said tubular axle for valve operation.

* * * * *